US010836502B2

(12) United States Patent
Gakhar et al.

(10) Patent No.: US 10,836,502 B2
(45) Date of Patent: Nov. 17, 2020

(54) WAVE-SHAPED ACOUSTIC INSERT AND CORE

(71) Applicant: The Boeing Company, Chicago, IL (US)

(72) Inventors: Kanika Gakhar, College Station, TX (US); Justin Honshune Lan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 15/843,583

(22) Filed: Dec. 15, 2017

(65) Prior Publication Data

US 2019/0185171 A1 Jun. 20, 2019

(51) Int. Cl.
*B64D 33/02* (2006.01)
*G10K 11/172* (2006.01)
*B64C 21/10* (2006.01)
*B64C 1/40* (2006.01)
*F01N 1/08* (2006.01)

(52) U.S. Cl.
CPC ............... *B64D 33/02* (2013.01); *B64C 1/40* (2013.01); *B64C 21/10* (2013.01); *B64C 2230/14* (2013.01); *B64C 2230/24* (2013.01); *B64D 2033/0206* (2013.01)

(58) Field of Classification Search
CPC ........... B64D 2033/0206; B64D 33/02; B64D 33/06; B32B 3/12; B64C 2230/14; B64C 2230/24; B64C 1/40; G10K 11/172; G10K 11/16; F01N 1/081; F01N 1/082; F01N 2230/02
See application file for complete search history.

(56) References Cited

U.S. PATENT DOCUMENTS

| 3,905,443 | A | * | 9/1975 | Sieuzac | B32B 3/12 181/291 |
| 3,983,283 | A | * | 9/1976 | Bagley | B01D 53/86 428/116 |
| 4,141,433 | A | * | 2/1979 | Warnaka | G10K 11/172 181/224 |
| 4,530,418 | A | * | 7/1985 | Currie | F01N 1/08 181/227 |
| 4,550,046 | A | * | 10/1985 | Miller | B29D 24/005 428/116 |
| 5,997,985 | A | * | 12/1999 | Clarke | B32B 3/12 428/116 |
| 6,536,556 | B2 | * | 3/2003 | Porte | B32B 3/12 181/284 |
| 6,615,950 | B2 | * | 9/2003 | Porte | G10K 11/172 181/290 |

(Continued)

OTHER PUBLICATIONS

Koch, "Investigation of a Bio-Inspired Liner Concept," Acoustics Technical Working Group Meeting, NASA Langley Research Center, Hampton, Virginia, Apr. 12, 2017, 28 pages. https://ntrs.nasa.gov/archive/nasa/casi.ntrs.nasa.gov/20170005665.pdf.

(Continued)

*Primary Examiner* — Edgardo San Martin
(74) *Attorney, Agent, or Firm* — Yee & Associates, P.C.

(57) ABSTRACT

An acoustic insert comprises a sleeve and a number of wave-shaped passageways within the sleeve. A contour of the number of wave-shaped passageways is selected to provide a desired level of attenuation for a frequency of sound waves entering the sleeve.

20 Claims, 9 Drawing Sheets

(56) References Cited

U.S. PATENT DOCUMENTS

| | | | | |
|---|---|---|---|---|
| 7,033,452 | B2* | 4/2006 | Yamada | B01D 46/2418 |
| | | | | 156/293 |
| 7,048,986 | B2* | 5/2006 | Shah | B32B 3/12 |
| | | | | 428/117 |
| 8,047,329 | B1 | 11/2011 | Douglas et al. | |
| 8,733,500 | B1* | 5/2014 | Ayle | G10K 11/172 |
| | | | | 181/292 |
| 9,068,345 | B2* | 6/2015 | Ichihashi | E04B 1/84 |
| 9,469,985 | B1* | 10/2016 | Ichihashi | G10K 11/172 |
| 9,476,359 | B2* | 10/2016 | Soria | E04B 1/82 |
| 9,607,598 | B2* | 3/2017 | Leon | B32B 3/12 |
| 9,623,952 | B1 | 4/2017 | Jones et al. | |
| 9,691,370 | B1* | 6/2017 | Stone | G10K 11/168 |
| 9,741,331 | B1* | 8/2017 | Alam | B32B 15/14 |
| 10,369,763 | B2* | 8/2019 | Lan | B32B 3/12 |
| 10,460,714 | B1* | 10/2019 | Koch | G10K 11/162 |
| 2016/0375648 | A1* | 12/2016 | Adams | B32B 3/12 |
| | | | | 428/117 |

OTHER PUBLICATIONS

Lan, "Segmented Acoustic Insert," U.S. Appl. No. 15/490,999, filed Apr. 19, 2017, 38 pages.

* cited by examiner

WAVE-SHAPED ACOUSTIC INSERT AND CORE

BACKGROUND INFORMATION

1. Field

The present disclosure relates generally to acoustic systems for aircraft applications. More specifically, the present disclosure relates to a wave-shaped acoustic insert and core used for reducing noise in an aircraft structure.

2. Background

Some aircraft systems generate undesired levels of noise while in operation. Aircraft engines, for example, can produce noise levels that exceed noise regulations governing commercial aircraft. Aircraft manufacturers reduce this excess noise by using acoustic systems within the engine. These acoustic systems are sometimes referred to as acoustic treatments or liners.

Acoustic systems typically include a honeycomb core secured between two facesheets. One facesheet may be porous and the other facesheet is non-porous. Sound waves pass through each cell of the honeycomb and are attenuated based on how the system is designed. In some cases, acoustic material is placed within the cells to increase attenuation performance.

In some areas of the aircraft, the geometry of an acoustic system is constrained due to limited available space in an aircraft structure. Specifically, the depth of the honeycomb cell is constrained. These geometrical space limitations may affect the performance of the acoustic system such that the desired level of noise attenuation is not met.

Therefore, it would be desirable to have a method and apparatus that takes into account at least some of the issues discussed above, as well as other possible issues. For example, it would be desirable to have a method or device that can increase the performance of the acoustic system and yet satisfy the geometrical space constraints.

SUMMARY

An illustrative embodiment of the present disclosure provides a sleeve and a number of wave-shaped passageways within the sleeve. A contour of the number of wave-shaped passageways is selected to provide a desired level of attenuation for a frequency of sound waves entering the sleeve.

Another illustrative embodiment of the present disclosure provides an acoustic dampening system having a first facesheet, a second facesheet opposite the first facesheet, a core, and a number of wave-shaped passageways. The core has a first edge, a second edge, and cells. The number of wave-shaped passageways are located within at least one cell in the core. The first edge of the core touches the first facesheet and the second edge of the core touches the second facesheet. The number of wave-shaped passageways is configured to attenuate sounds waves passing through the cell.

A further illustrative embodiment of the present disclosure provides a method for reducing noise in an aircraft. An acoustic insert comprising a sleeve and a number of wave-shaped passageways within the sleeve is formed. The acoustic insert is positioned within a cell in a honeycomb core. Sound waves pass through the acoustic insert and the number of wave-shaped passageways and are attenuated accordingly.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that geometrical space constraints within an aircraft structure limit the length and thickness that can be used for acoustic systems. Attenuation performance of an acoustic system is dependent on the length of path traversed by the sound wave and/or the thickness of the damping material used within the acoustic system. Accordingly, some acoustic systems currently used in areas with space constraints may not reduce noise in a desired manner, especially at low frequencies. It is desirable to increase dampening performance at low frequencies without increasing the length of the cell in an acoustic liner or the thickness of the material used in the acoustic liner.

The illustrative embodiments also recognize and take into account that manufacturing process for reducing noise in aircraft engines is often more expensive and time consuming than desired. Bonding acoustic material to a honeycomb core, then trimming the structure afterwards, creates unnecessary waste product. Additionally, bonding acoustic material into cells within the honeycomb core takes more time than desired. It would be desirable to have a faster, less expensive process for placing acoustic material into the honeycomb core, while still increasing attenuation performance at various frequencies.

The disclosed embodiments relate to an acoustic system that can be used in a wide variety of applications for reducing noise in an aerospace structure. However, components described herein have an application to many systems in need of noise attenuation.

Figure 1:
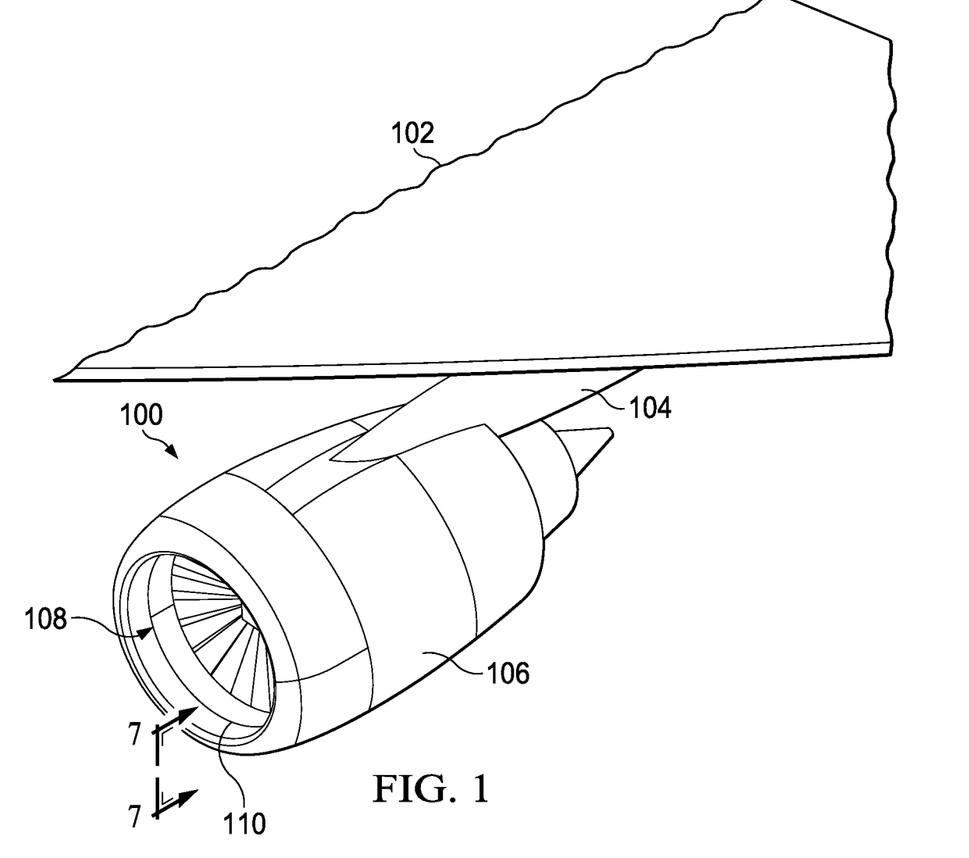
FIG. 1 is an illustration of a perspective view of a portion of an aircraft showing an engine having an acoustic system in accordance with an illustrative embodiment.

With reference now to the figures, and in particular, with reference to FIG. 1, an illustration of a perspective view of a portion of an aircraft showing an engine having an acoustic system is depicted in accordance with an illustrative embodiment. Engine 100 is mounted to wing 102 by pylon 104. Engine 100 is an aircraft engine in this illustrative example. In other illustrative examples, engine 100 may be an engine for another type of aerospace structure.

Engine 100 has nacelle 106 having inlet 108. Inlet 108 functions to direct airflow into engine 100. Inlet 108 includes acoustic system 110. Acoustic system 110 may be referred to as an "acoustically treated area" or an "acoustic liner" in some illustrative examples. Acoustic system 110 is configured to reduce noise caused by the engine's rotating blades. Noise reduction is desired because engine noise often propagates through inlet 108 to the ground or airplane cabin.

Figure 2:
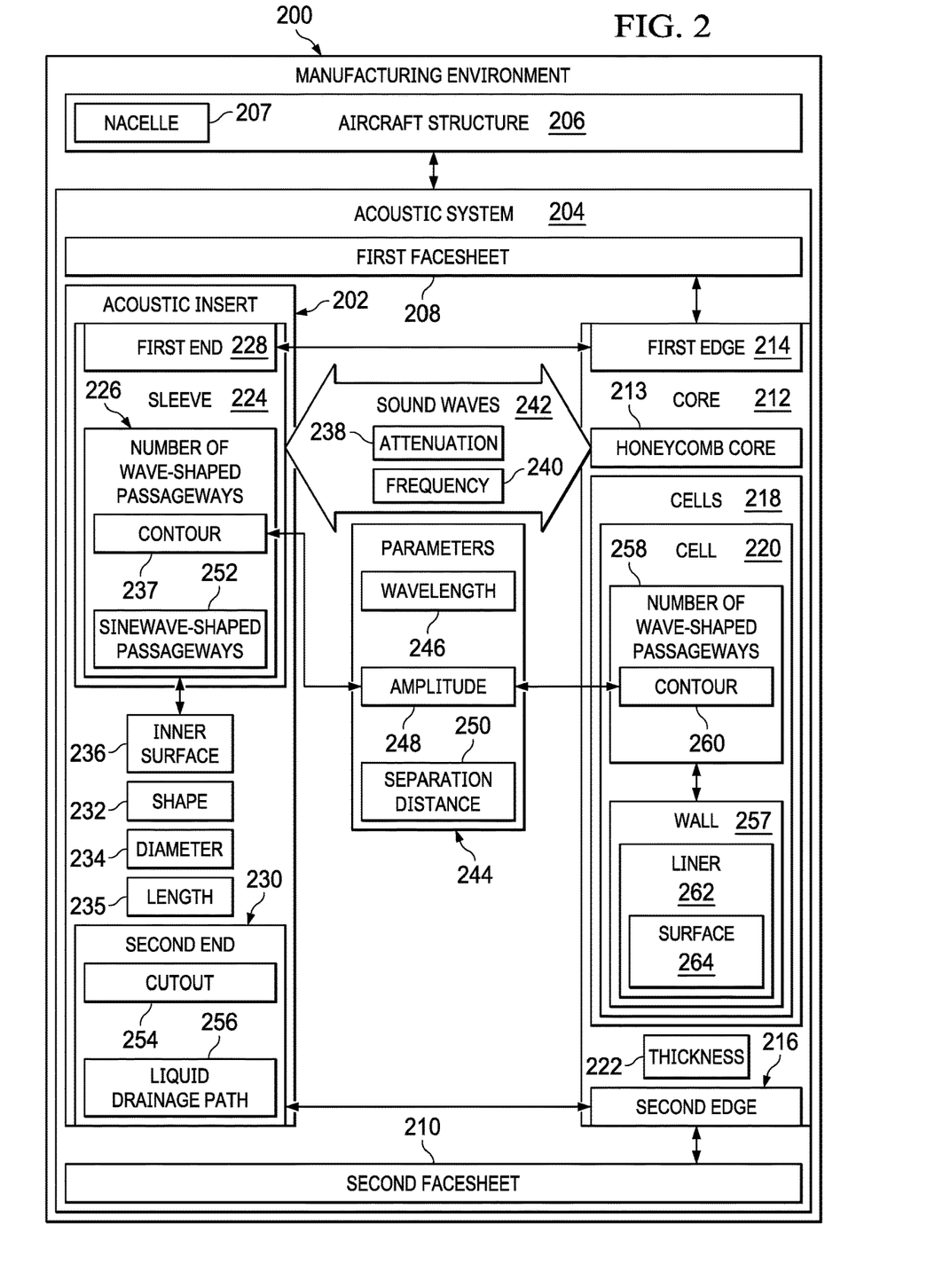
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where acoustic insert 202 may be manufactured for use in acoustic system 204. Acoustic system 204 may then be installed in aircraft structure 206. Alternatively, acoustic system 204 may be installed in aircraft structure 206 prior to acoustic insert 202 being added. Acoustic system 204 also may be known as an acoustic lining.

In an illustrative example, aircraft structure 206 may be any type of aerospace structure where reducing noise is desirable. Aircraft structure 206 may be in the interior or exterior of the aircraft. For example, without limitation, aircraft structure 206 may be an engine nacelle, an engine fan case, a thrust reverser, a muffler, a panel, a portion of the fuselage, or any other type of aerospace structure where acoustic system 204 may be used to reduce noise. In this illustrative example, aircraft structure 206 takes the form of nacelle 207.

Acoustic system 204 comprises first facesheet 208, second facesheet 210, core 212, and acoustic insert 202. Second facesheet 210 is oriented opposite of first facesheet 208. First facesheet 208 and second facesheet 210 provide structural support for acoustic system 204.

First facesheet 208 and second facesheet 210 may be comprised of a material selected from at least one of a composite material, a metal, a plastic, a ceramic, or other suitable types of material. If first facesheet 208 or second facesheet 210 comprise a composite material, that material may be carbon fiber reinforced plastic (CRFP).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In this illustrative example, core 212 takes the form of honeycomb core 213. Core 212 may be comprised of other types of core material and/or other shapes in some illustrative examples.

Core 212 has first edge 214, second edge 216, and cells 218. First edge 214 is opposite of second edge 216. First edge 214 of core 212 touches first facesheet 208. Second edge 216 of core 212 touches second facesheet 210.

First facesheet 208 and second facesheet 210 may be bonded to first edge 214 and second edge 216 of core 212, respectively. A number of these bonds may be a result of a process selected from at least one of ultrasonic welding, laser heating, infrared heating, application of adhesive material, or some other type of bonding process. As used herein, "a number of" when used with reference to items means one or more items. Thus, a number of bonds include one or more bonds.

Core 212 is formed of cells 218. Cells 218 define chambers in core 212. Each cell in cells 218 may have a hexagonal shape. However, other cell geometries are possible. For example, without limitation, each cell in cells 218 may have a circular shape, a rectangular shape, a triangular shape, or some other suitable shape. Cell 220 is one of cells 218. Core 212 may be comprised of a material selected from at least one of aluminum, a polymer, a metal, or other suitable types of materials.

Core 212 has thickness 222. Thickness 222 is measured as the distance between first edge 214 and second edge 216 of core 212. Thickness 222 may be selected to form the desired shape or functionality for acoustic insert 202.

As depicted in this example, acoustic insert 202 is positioned within cell 220 in cells 218. Acoustic insert 202 comprises sleeve 224 and number of wave-shaped passageways 226. Number of wave-shaped passageways 226 are located within sleeve 224.

Sleeve 224 has first end 228 and second end 230. First end 228 is opposite of second end 230 of sleeve 224. Sleeve 224 may be comprised of one solid segment or multiple segments secured together by at least one of an adhesive, a welding material, ultrasonic welding, laser heating, infrared heating, friction, or other suitable processes.

Acoustic system 204 with acoustic insert 202 is configured to reduce noise in aircraft structure 206 by absorbing noise at various frequency ranges. Depending on how acoustic system 204 is designed, the bandwidth of frequencies absorbed may be altered as desired.

Acoustic insert 202 may be comprised of a material selected from at least one of a plastic, a metal, or some other suitable type of material. The material selected for acoustic insert 202 may affect the noise absorption properties of acoustic insert 202.

Sleeve 224 has shape 232, diameter 234, and length 235. Shape 232 may be the same over the entire length of sleeve 224. Shape 232 may be a circular shape, a rectangular shape, a hexagonal shape, a triangular shape, or some other suitable shape. In other illustrative examples, shape 232 may be wider or narrower at different parts of sleeve 224.

Diameter 234 of sleeve 224 may be configured to fit within cell 220 in core 212 of acoustic system 204. In this illustrative example, diameter 234 of sleeve 224 is configured such that friction joins sleeve 224 to core 212. In other illustrative examples, diameter 234 may be such that sleeve 224 moves slightly within cell 220 of core 212.

Length 235 of sleeve 224 may be substantially the same as thickness 222 of core 212 in this illustrative example. In some examples, length 235 of sleeve 224 may be less than thickness 222 of core 212. Length 235 of sleeve 224 may affect the frequency response of acoustic insert 202.

As depicted, number of wave-shaped passageways 226 are located within sleeve 224. Number of wave-shaped passageways 226 may run length 235 of sleeve 224 from first end 228 to second end 230 in this illustrative example. In other illustrative examples, number of wave-shaped passageways 226 may cover only a portion of length 235 within sleeve 224.

A passageway in number of wave-shaped passageways 226 is a path through which a sound wave will traverse. Each passageway is formed by at least two pieces of material, each having a wave-shape, such that sound waves pass between the pieces of material. In this illustrative example, number of wave-shaped passageways 226 may be formed as part of sleeve 224. For instance, number of wave-shaped passageways 226 may be formed on inner surface 236 of sleeve 224. As an example, material may be extruded onto inner surface 236 of sleeve 224 or number of wave-shaped passageways 226 may be printed onto inner surface 236 of sleeve 224. Number of wave-shaped passageways 226 may be formed as part of sleeve 224 by other means as well.

In other illustrative examples, number of wave-shaped passageways 226 are formed as part of a filler material positioned inside of sleeve 224 in a desired manner. In still other illustrative examples, number of wave-shaped passageways 226 may be added as a liner. The liner, having number of wave-shaped passageways 226, may be added to inner surface 236 of sleeve 224 prior to installation within cell 220 of core 212.

Each of number of wave-shaped passageways 226 has contour 237. Contour 237 is selected to provide a desired level of attenuation 238 for frequency 240 of sound waves 242 entering sleeve 224. Both pieces of material creating a passageway within sleeve 224 each have contour 237.

Contour 237 of each of number of wave-shaped passageways 226 is based on parameters 244. Parameters 244 for number of wave-shaped passageways 226 are configured to attenuate sound waves 242 at a predetermined frequency range, or bandwidth. Parameters 244 may be selected from at least one of wavelength 246, amplitude 248, separation distance 250, or some other suitable parameter.

Changing either wavelength 246 or amplitude 248 of number of wave-shaped passageways 226 increases the length of the path traversed by sound waves 242 without changing length 235 of sleeve 224. Therefore, sound waves 242 may be absorbed at lower frequencies without the need to increase length 235 of sleeve 224. In other words, number of wave-shaped passageways 226 in sleeve 224 decrease frequency 240 at peak absorption.

Separation distance 250 denotes the distance between two waves in one of number of wave-shaped passageways 226. Separation distance 250 and the number of passageways may affect peak absorption of sound waves 242 within sleeve 224 due to viscous losses on the walls of the wave-shaped passageways.

As depicted, number of wave-shaped passageways 226 take the form of sinewave-shaped passageways 252. In other words, contour 237 has a sinewave shape. Number of wave-shaped passageways 226 may have other waveforms, depending on the particular implementation. For instance, number of wave-shaped passageways 226 may have a square, triangle, ramp, sawtooth, or other contour.

In some illustrative examples, acoustic insert 202 may have cutout 254 at second end 230 of sleeve 224. Cutout 254 may be configured to provide liquid drainage path 256 to sleeve 224. Liquid drainage path 256 is configured to allow water to flow out of core 212 to avoid damage to various structures in acoustic system 204. Cutout 254 may have various shapes, depending on the application.

Different configurations of sleeve 224 may be used in cells 218 of core 212. For example, without limitation, some of cells 218 may have sleeves with different parameters 244 for each passageway within a sleeve. Some sleeves may not have passageways at all. In this manner, acoustic system 204 is completely customizable to the attenuation needs of aircraft structure 206.

In another illustrative example, sleeve 224 may be bonded to wall 257 of cell 220. If sleeve 224 is bonded to wall 257 of cell 220, an adhesive material or other joining process may be used.

In still other illustrative examples, sleeve 224 is not bonded to core 212 in any manner. In such a case, manufacturing and assembly time is significantly decreased. For example, a robotic system can quickly insert each sleeve into each cell of core 212 without the extra step of adding adhesive.

In some illustrative examples, acoustic insert 202 may not be used in assembling acoustic system 204. When acoustic insert 202 is not used, number of wave-shaped passageways 258 may be formed within at least one cell in core 212. For example, number of wave-shaped passageways 258 may be located within cell 220 and formed as part of core 212. Specifically, number of wave-shaped passageways 258 may be formed on wall 257 of cell 220.

In other illustrative examples, number of wave-shaped passageways 258 are formed on surface 264 of liner 262. Liner 262 is then attached to wall 257 of cell 220. In still other illustrative examples, number of wave-shaped passageways 258 are formed as filler material and inserted into cell 220.

Each of number of wave-shaped passageways 258 is configured to attenuate sounds waves 242 passing through cell 220 in the same manner as discussed previously. Contour 260 of number of wave-shaped passageways 258 is selected to provide a desired level of attenuation 238 for frequency 240 of sound waves 242 entering cell 220. Number of wave-shaped passageways 258 may run through cell 220 from first edge 214 to second edge 216 of core 212. In this manner, wave-shaped passageways may be formed on either sleeve 224 or cell 220 to provide the desired level of functionality.

The illustrative examples provide an acoustic system that can be easily and quickly modified for any application. Additionally, if a portion of aircraft structure 206 is damaged in operation, repairs can be completed on one or more of cells 218 of core 212. For instance, since an adhesive application is not required, damaged acoustic inserts can be replaced with new acoustic inserts without replacing the entirety of the honeycomb. In the same manner, the functionality of acoustic system 204 may be changed by replacing sleeves and thus, attenuating different frequency ranges, without destroying or replacing the part. Acoustic inserts can be mass produced and quickly positioned within core 212. Acoustic inserts may be placed in the system before, during, or after aircraft structure 206 is trimmed. As a result, trimming waste may be reduced.

Acoustic system 204, as a whole, may be configured to achieve desired acoustic impedance by adjusting parameters 244 of any of the wave-shaped passageways (226, 258). By changing one or more of parameters 244, manufacturers can shift the peak absorbed frequency 240 to lower frequencies compared to conventional acoustic linings of the same thickness.

Figure 3:
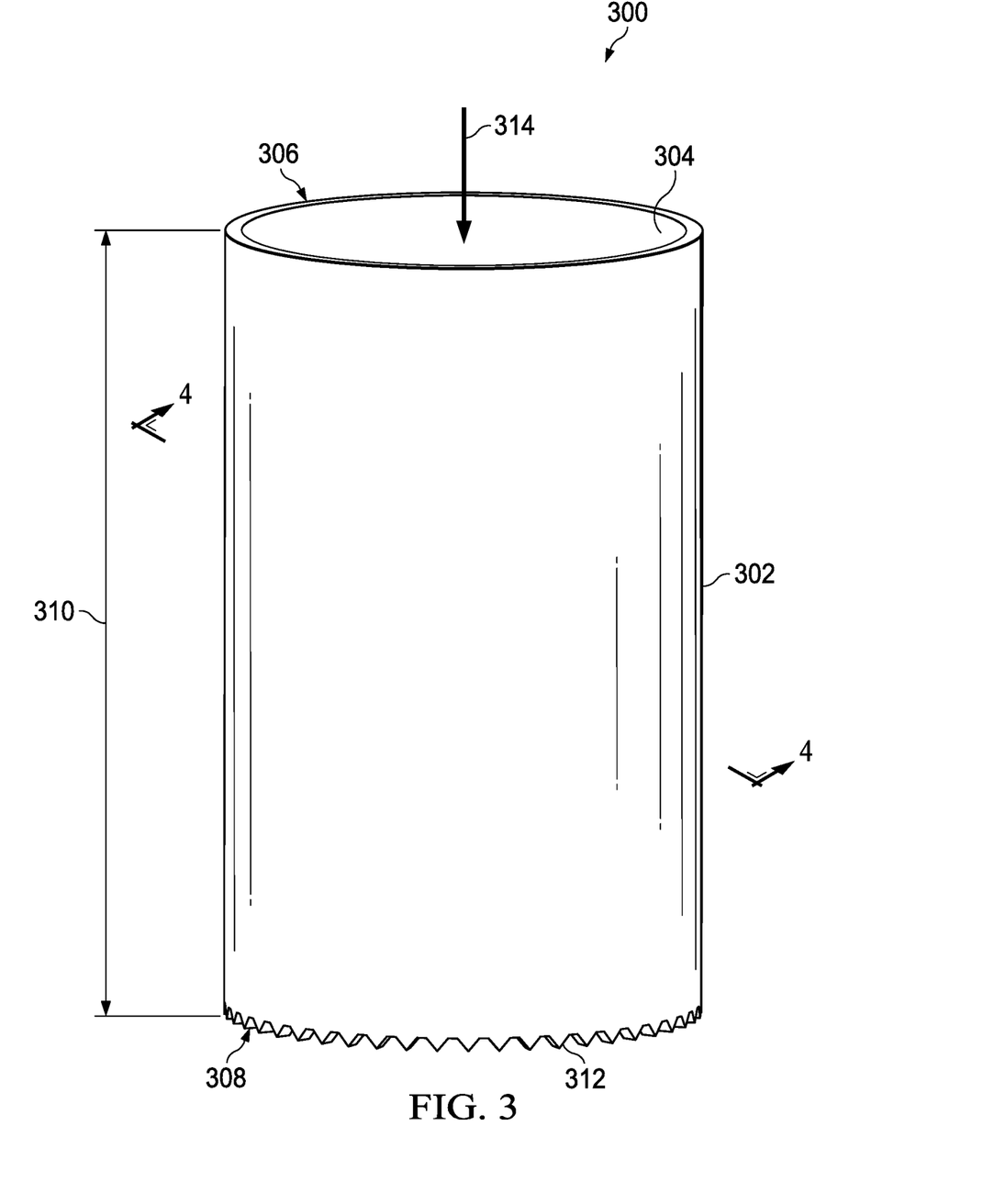
FIG. 3 is an illustration of a perspective view of an acoustic insert in accordance with an illustrative embodiment.

With reference next to FIG. 3, an illustration of a perspective view of an acoustic insert is depicted in accordance with an illustrative embodiment. FIG. 3 depicts an example of one implementation for acoustic insert 202 and the components within acoustic insert 202 as described with reference to FIG. 2.

As depicted, acoustic insert 300 has a tubular shape. Acoustic insert 300 has sleeve 302 with a single segment in this illustrative example. Wave-shaped passageways (not shown in this view) are located within sleeve 302.

Sleeve 302 has end 306 and end 308. Length 310 of sleeve 302 is the distance between end 306 and end 308. In this illustrative example, end 308 has cutout 312. Cutout 312 is configured to provide a liquid drainage path for acoustic insert 300. Although cutout 312 is shown in this particular configuration, any number of configurations is possible. In some cases, cutout 312 will be absent.

When acoustic insert 300 is installed in a honeycomb core, sleeve 302 will run parallel to the chambers in the honeycomb core and between two facesheets. End 306 will be positioned perpendicular to one facesheet of the acoustic system, while end 308 will be positioned perpendicular to the opposite facesheet. At least one of end 306 and end 308 may touch the facesheets or a gap may be present.

After acoustic insert 300 is installed in an aircraft structure, sound waves flow through sleeve 302 in the direction of arrow 314. Noise is reduced as it passes through sleeve 302.

Figure 4:
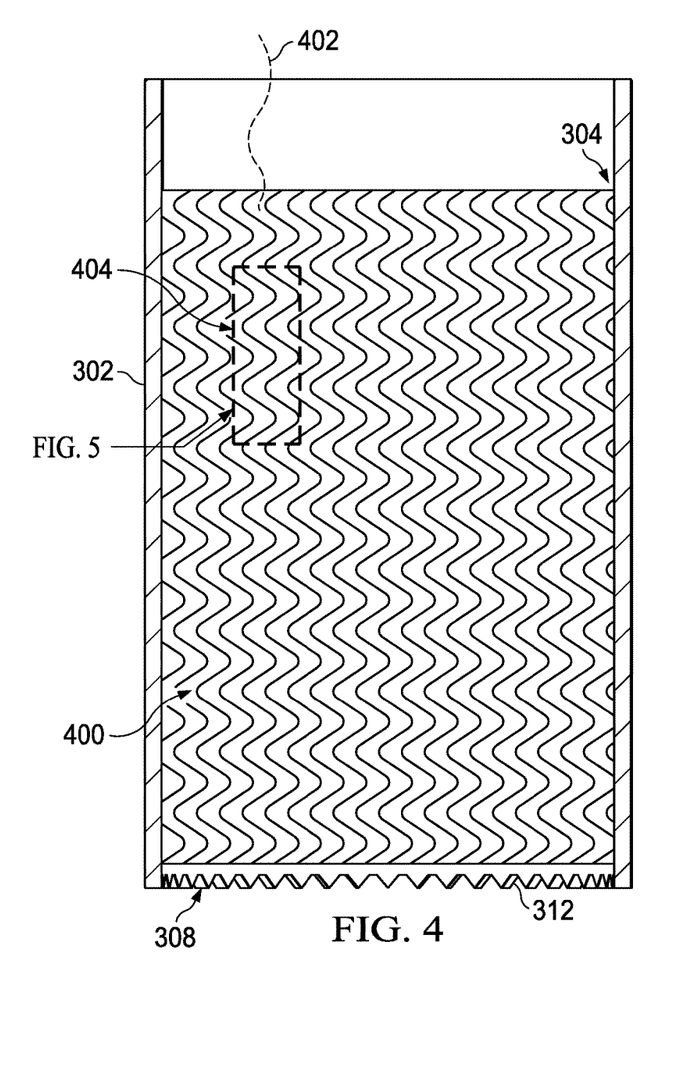
FIG. 4 is an illustration of a cross-sectional view of a wave-shaped passageway in an acoustic insert in accordance with an illustrative embodiment.

Turning next to FIG. 4, an illustration of a cross-sectional view of an acoustic insert having wave-shaped passageways is depicted in accordance with an illustrative embodiment. This cross-sectional view is shown along lines 4-4 in FIG. 3.

As illustrated, wave-shaped passageways 400 are located within sleeve 302. In this illustrative example, wave-shaped passageways 400 are formed as a part of sleeve 302. Wave-shaped passageways 400 begin at inner surface 304 of sleeve 302 and move inward. Wave-shaped passageways 400 have a sinewave shape in this illustrative example.

Sound wave 402 travels through sleeve 302 and encounters wave-shaped passageways 400. It then begins to traverse wave-shaped passageways 400. A portion of a passageway is shown in section 404.

Figure 5:
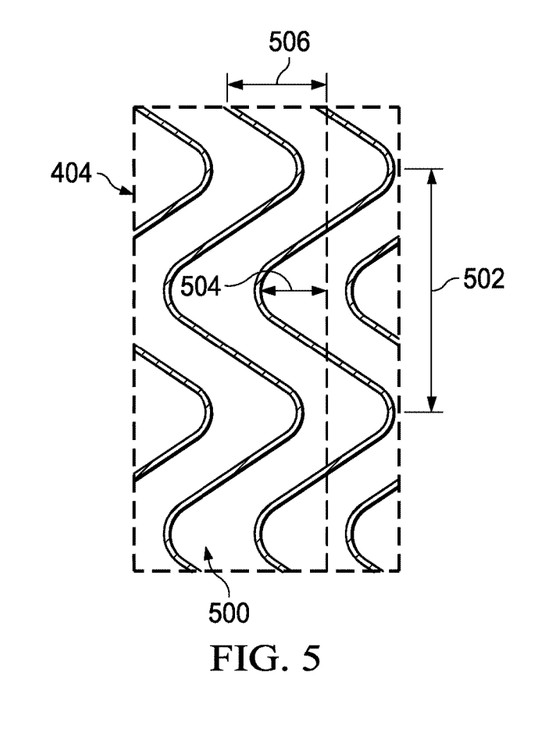
FIG. 5 is an illustration of a wave-shaped passageway in accordance with an illustrative embodiment.

Next, in FIG. 5, an illustration of a wave-shaped passageway in an acoustic insert is depicted in accordance with an illustrative embodiment. FIG. 5 shows section 404 of wave-shaped passageways 400 in sleeve 302 from FIG. 4 is greater detail.

As depicted, wave-shaped passageway 500 is comprised of two sinewaves. Parameters may be adjusted for wave-shaped passageway 500 to lengthen the distance traveled by sound wave 402 and thus, the peak absorption frequency.

Parameters for wave-shaped passageway 500 include wavelength 502, amplitude 504, and separation distance 506. Wavelength 502 and amplitude 504 are parameters of the sinewave itself. Separation distance 506 denotes the spacing between the sinewave-shaped walls that form wave-shaped passageway 500.

Figure 6:
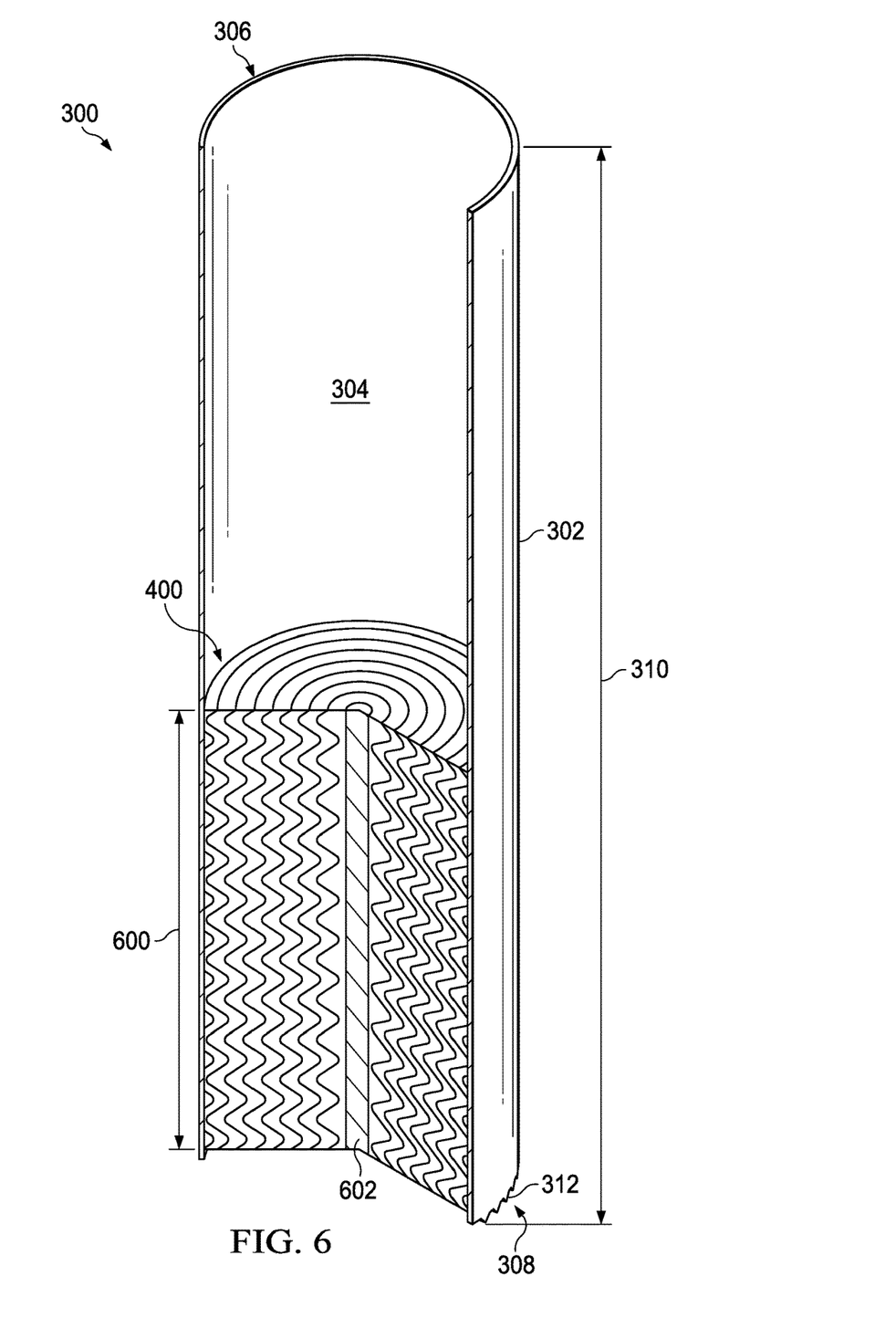
FIG. 6 is an illustration of a cut-away view of an acoustic insert with wave-shaped passageways in accordance with an illustrative embodiment.

Turning next to FIG. 6, an illustration of a cut-away view of an acoustic insert with wave-shaped passageways is depicted in accordance with an illustrative embodiment. In this view, acoustic insert 300 is shown with wave-shaped passageways 400 running along distance 600 of length 310 of sleeve 302. In other illustrative examples, wave-shaped passageways 400 may traverse more, or less, of length 310 of sleeve 302 than shown in FIG. 6. In some cases, wave-shaped passageways 400 may run the entirety of length 310 of sleeve 302.

As illustrated, filler 602 is positioned in the center of sleeve 302. Filler 602 ensures that sound waves move through wave-shaped passageways 400 instead of taking the path of least resistance through the center of sleeve 302. In other illustrative example, the center of sleeve 302 may be filled in a manner other than a solid support structure, depending on the particular implementation.

Figure 7:
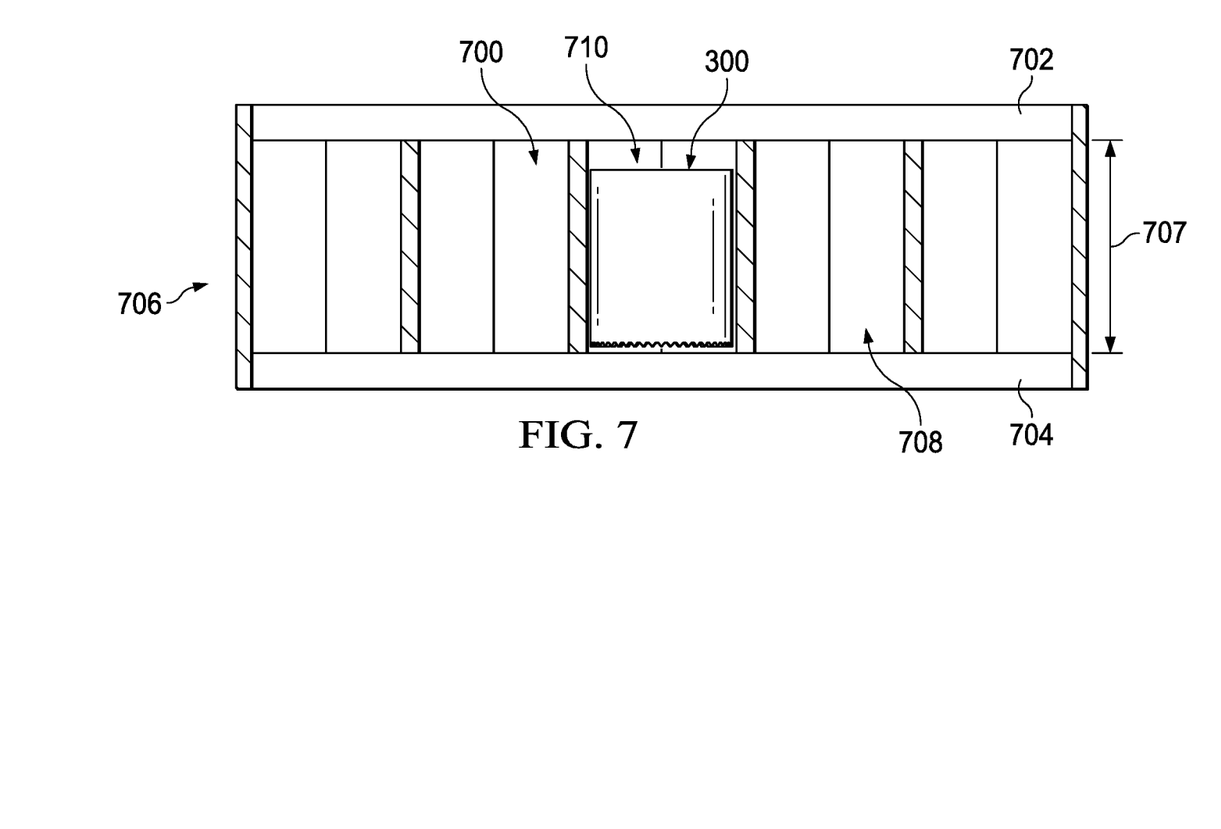
FIG. 7 is an illustration of a cross-sectional view of an acoustic insert inside a honeycomb core in accordance with an illustrative embodiment.

In FIG. 7, an illustration of a cross-sectional view of an acoustic insert inside a honeycomb core is depicted in accordance with an illustrative embodiment. This Figure shows a cross-sectional view taken along lines 7-7 in FIG. 1. Acoustic insert 300 from FIG. 3 has been inserted into honeycomb core 700 in this illustrative example.

Acoustic insert 300, honeycomb core 700, facesheet 702, and facesheet 704 form acoustic system 706. The components in acoustic system 706 are illustrative examples of the components in acoustic system 204 shown in block form in FIG. 2.

As depicted, honeycomb core 700 has thickness 707. Thickness 707 may be substantially the same as length 310 of sleeve 302 shown in FIG. 3. Honeycomb core 700 includes cells 708. Acoustic insert 300 has been inserted into cell 710 of honeycomb core 700 in this illustrative example. In other examples, a number of additional cells in cells 708 may contain an acoustic insert similar to acoustic insert 300.

Figure 8:
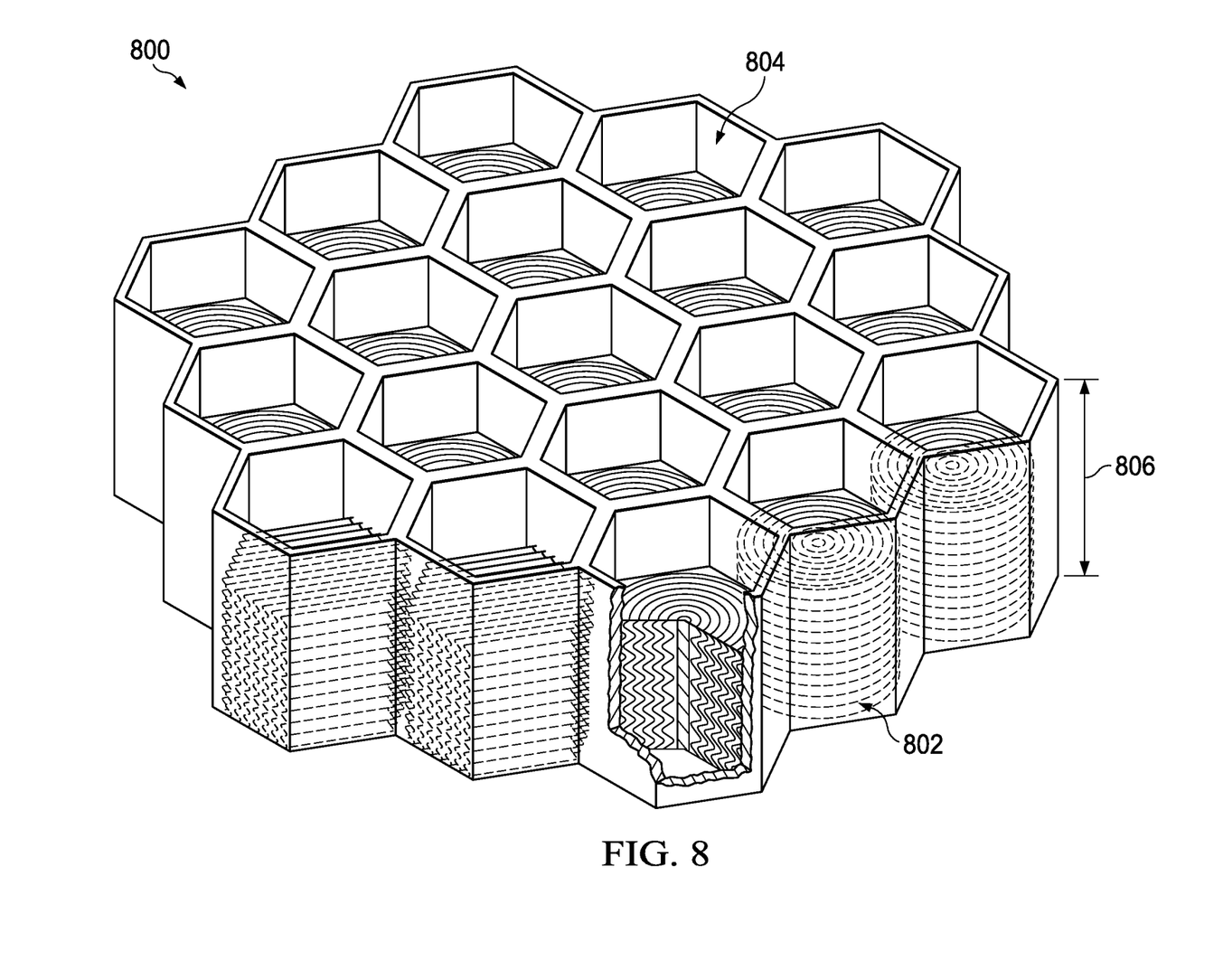
FIG. 8 is an illustration of a honeycomb core having wave-shaped passageways in accordance with an illustrative embodiment.

Turning now to FIG. 8, an illustration of a honeycomb core having wave-shaped passageways is depicted in accordance with an illustrative embodiment. Core 800 with wave-shaped passageways 802 is an example of one implementation for core 212 with number of wave-shaped passageways 258 shown in block form in FIG. 2.

In this illustrative example, core 800 has cells 804. Wave-shaped passageways 802 line the walls of each of cells 804 in this illustrative example.

Core 800 has thickness 806. Thickness 806 corresponds to the depth of each cell. Wave-shaped passageways 802 do not run the entire depth of cells 804 in this illustrative example. Two examples of different configurations for wave-shaped passageways are shown in core 800.

As illustrated, some of wave-shaped passageways 802 run across the cell. Others are cylindrical, similar to wave-shaped passageways 400 shown in FIG. 4.

The illustration of wave-shaped passageways 802 in this figure is not meant to limit other configurations for wave-shaped passageways used in an illustrative embodiment. In other illustrative examples, some of cells 804 may be empty. In still other illustrative examples, wave-shaped passageways 802 may be uniform in all of cells 804. In this manner, acoustic attenuation is completely customizable at the level of each cell in core 800.

Different acoustic systems may be used in each portion of an aircraft structure. For example, different configurations for acoustic linings may be used in different sections within nacelle 106 of engine 100 shown in FIG. 1. Acoustic inserts may be absent in an engine fan case, for example, while an engine inlet might have acoustic inserts in each cell in the honeycomb core.

Different thicknesses of core, depths of wave-shaped passageways, and lengths of sleeves may be used to reach desired noise reduction. Materials may be selected based on structural integrity concerns, temperature conditions, or other desired functionality for an acoustic system. In this manner, an illustrative embodiment may be versatile in its application, inexpensively produced, and quickly assembled.

Engine 100 in FIG. 1 is only one physical implementation of a platform incorporating acoustic insert 202 in FIG. 2. Although the examples for an illustrative embodiment are described with respect to an aircraft, an illustrative embodiment may be applied to other types of platforms. Acoustic insert 202 may be used in any platform where noise reduction is desired. The platform may be, for example, a mobile platform, a stationary platform, a land-based structure, an aquatic-based structure, or a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-8 may be combined with components in FIG. 2, used with components in FIG. 2, or a combination of the two. Additionally, some of the components in FIG. 1 and FIGS. 3-8 may be illustrative examples of how components shown in block form in FIG. 2 may be implemented as physical structures.

Figure 9:
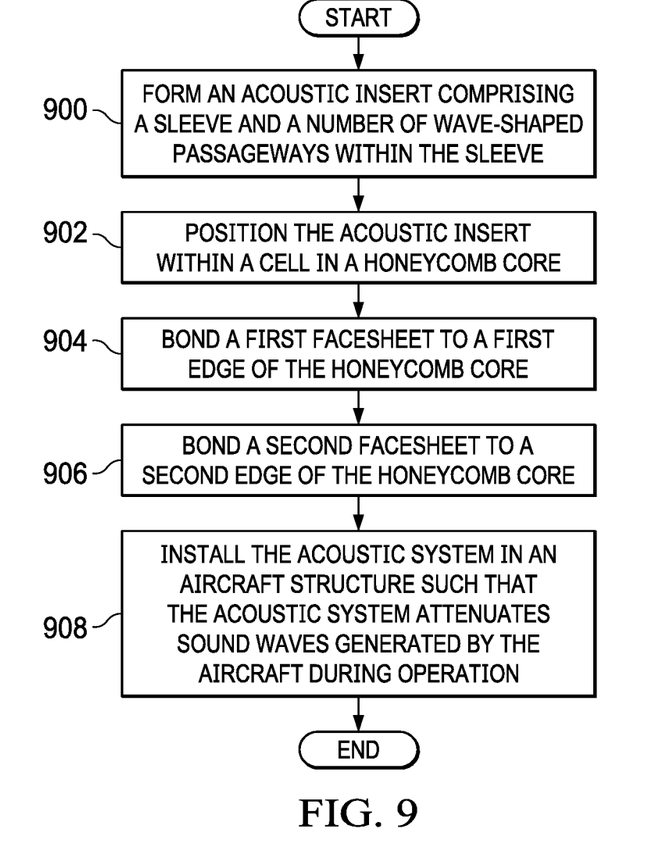
FIG. 9 is an illustration of a flowchart of a process for reducing noise in an aircraft in accordance with an illustrative embodiment.

Turning now to FIG. 9, an illustration of a flowchart of a process for reducing noise in an aircraft is depicted in accordance with an illustrative embodiment. The method depicted in FIG. 9 may be used to assemble acoustic system 204 shown in FIG. 2. The method reduces noise while the aircraft is in operation.

The process begins by forming an acoustic insert comprising a sleeve and a number of wave-shaped passageways within the sleeve (operation 900). The acoustic insert is configured to be fitted within a cell in a honeycomb core.

The sleeve with the wave-shaped passageways is tuned to absorb a desired range of frequencies. Operation 900 may include selecting parameters for a contour of the number of wave-shaped passageways to provide a desired level of attenuation for a frequency of the sound waves entering a cell of the honeycomb core. The wave-shaped passageways may be formed in the sleeve or adhered to the inner surface of the sleeve via a liner. Optionally, a cutout is formed on the second end of the sleeve.

Next, the process positions the acoustic insert within a cell in a honeycomb core (operation 902). In some examples, the acoustic insert is not bonded to the honeycomb core. In other examples, the honeycomb core is formed as part of the process described herein. Operation 902 may occur after the honeycomb core is completely formed, trimmed, or both.

The process then bonds a first facesheet to a first edge of the honeycomb core (operation 904). A second facesheet is then bonded to a second edge of the honeycomb core (operation 906). The acoustic insert is now positioned within the cell between the first facesheet and the second facesheet to form an acoustic system. The acoustic system is then installed in an aircraft structure such that the acoustic system attenuates sound waves generated by the aircraft during operation (operation 908) with the process terminating thereafter.

In illustrative examples where acoustic inserts are not used, the wave-shaped passageways are formed on the walls of the cells in the honeycomb core. The honeycomb core is then bonded to both facesheets and installed in an aircraft structure.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 10:
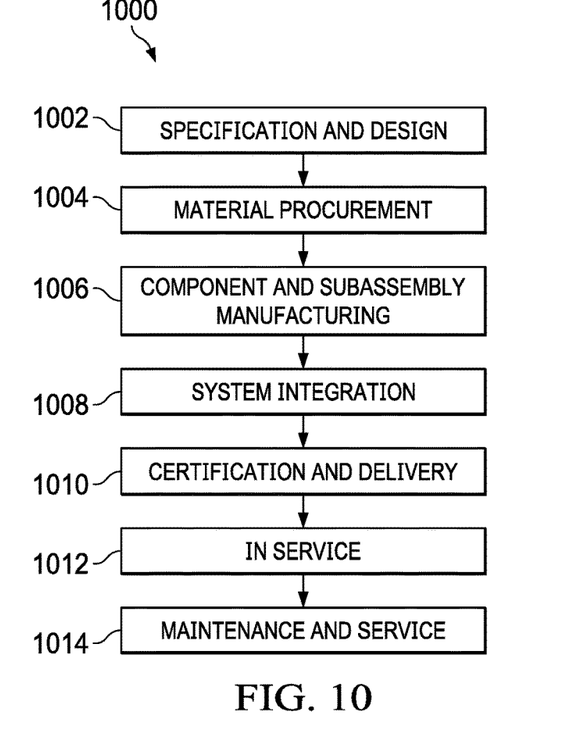
FIG. 10 is an illustration of a block diagram of an aircraft manufacturing and service method in accordance with an illustrative embodiment.
Figure 11:
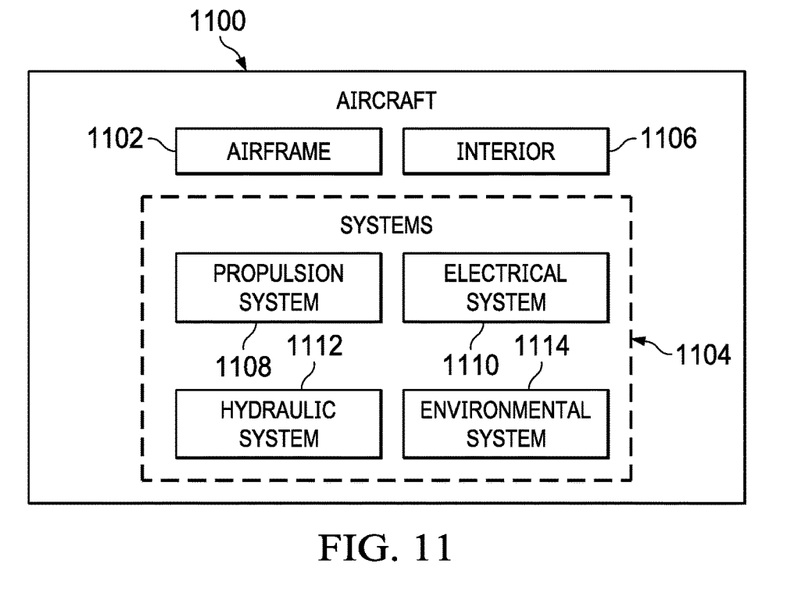
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Acoustic system 204 from FIG. 2 and the components within acoustic system 204 may be made during component and subassembly manufacturing 1006. In addition, acoustic insert 202 may be used in parts made for routine maintenance and service 1014 as part of a modification, reconfiguration, or refurbishment of aircraft 1100.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included.

Although an aerospace example is shown, different illustrative embodiments may be applied to other industries, such as the automotive industry. Apparatuses and methods embodied herein may be employed during at least one of the stages of aircraft manufacturing and service method 1000 in FIG. 10.

In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The illustrative embodiments describe a method for reducing noise in an aircraft. An aircraft is operated. The noise generated by the aircraft while operating the aircraft is reduced using sinewave-shaped passageways through which sound waves travel. The sinewave-shaped passageways may be part of the core of the acoustic system itself or inserts positioned within cells of the core.

The passageways are sized and shaped based on the desired frequency of sound to be reduced. The passageways allow the sound waves to travel greater lengths within the acoustic system without having to increase the length of the core. Implementations of an illustrative embodiment increase effective depth without having to increase thickness of the acoustic lining. Thus, greater absorption at lower frequencies can be achieved in geometrically-constrained areas of the aircraft. Greater sound reduction enhances passenger experience and ensures compliance with regulations.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An acoustic insert comprising:
    a sleeve; and
    a number of wave-shaped passageways within the sleeve, wherein each of the number of wave-shaped passageways comprises a uniform material.

2. The acoustic insert of claim 1, wherein a contour of the number of wave-shaped passageways is selected to provide a desired level of attenuation for a frequency of sound waves entering the sleeve.

3. The acoustic insert of claim 2, wherein the contour of the number of wave-shaped passageways is based on parameters selected from at least one of a wavelength, an amplitude, or a separation distance.

4. The acoustic insert of claim 1, wherein the sleeve has a diameter that fits within a cell in a core of an acoustic system.

5. The acoustic insert of claim 1, wherein the number of wave-shaped passageways are sinewave-shaped passageways.

6. The acoustic insert of claim 1, wherein the number of wave-shaped passageways run a length of the sleeve from a first end to a second end.

7. The acoustic insert of claim 1 further comprising: a cutout at a second end of the sleeve configured to provide a liquid drainage path to the sleeve.

8. The acoustic insert of claim 1, wherein the number of wave-shaped passageways are formed as part of the sleeve.

9. An acoustic system comprising:
    a first facesheet;
    a second facesheet opposite the first facesheet;
    a core having a first edge, a second edge, and cells, wherein the first edge of the core touches the first facesheet and the second edge of the core touches the second facesheet; and
    a number of wave-shaped passageways within a sleeve inserted within a cell in the core, wherein the number of wave-shaped passageways is configured to attenuate sounds waves passing through the cell,
    wherein the number of wave-shaped passageways comprises a uniform material and run through the cell from the first edge to the second edge of the core.

10. The acoustic system of claim 9, a contour of the number of wave-shaped passageways is selected to provide a desired level of attenuation for a frequency of sound waves entering the cell.

11. The acoustic system of claim 10, wherein the contour of the number of wave-shaped passageways is based on parameters selected from at least one of a wavelength, an amplitude, or a separation distance.

12. The acoustic system of claim 9, wherein the number of wave-shaped passageways are formed as part of the core.

13. The acoustic system of claim 9 further comprising:
    a liner attached to a wall of the cell in the core, wherein the number of wave-shaped passageways are formed on a surface of the liner.

14. The acoustic system of claim 9 further comprising:
    an acoustic insert positioned within the cell, wherein the number of wave-shaped passageways are formed on an inner surface of the acoustic insert.

15. The acoustic system of claim 9, wherein the core is a honeycomb core.

16. A method for reducing noise in an aircraft, the method comprising:
    forming an acoustic insert comprising a sleeve and a number of wave-shaped passageways within the sleeve, wherein the acoustic insert is configured to be fitted within a cell in a honeycomb core and wherein each of the number of wave-shaped passageways comprises a uniform material.

17. The method of claim 16 further comprising:
    bonding a first facesheet to a first edge of the honeycomb core; and
    bonding a second facesheet to a second edge of the honeycomb core such that the acoustic insert is positioned within the cell between the first facesheet and the second facesheet to form an acoustic system.

18. The method of claim 17 further comprising:
installing the acoustic system in an aircraft structure such that the acoustic system attenuates sound waves generated by the aircraft during operation.

19. The method of claim 16, wherein forming the acoustic insert comprises:
selecting parameters for a contour of the number of wave-shaped passageways to provide a desired level of attenuation for a frequency of sound waves entering the cell.

20. The acoustic system of claim 9, wherein the number of wave-shaped passageways are sinewave-shaped passageways.

* * * * *